US011117360B2

(12) United States Patent
Revanur et al.

(10) Patent No.: US 11,117,360 B2
(45) Date of Patent: Sep. 14, 2021

(54) DEVICE AND METHOD FOR GENERATING AND DISPLAYING DATA RELATING TO AN ADDITIVE MANUFACTURING PROCESS

(71) Applicant: RENISHAW PLC, Wotton-under-Edge (GB)

(72) Inventors: Ramkumar Revanur, Stafford (GB); Michael Joseph McClelland, Market Drayton (GB)

(73) Assignee: RENISHAW PLC, Wotton-under-Edge (GB)

( * ) Notice: Subject to any disclaimer, the term of this patent is extended or adjusted under 35 U.S.C. 154(b) by 843 days.

(21) Appl. No.: 15/574,979

(22) PCT Filed: Jun. 3, 2016

(86) PCT No.: PCT/GB2016/051635
§ 371 (c)(1),
(2) Date: Nov. 17, 2017

(87) PCT Pub. No.: WO2016/193742
PCT Pub. Date: Dec. 8, 2016

(65) Prior Publication Data
US 2018/0141123 A1  May 24, 2018

(30) Foreign Application Priority Data

Jul. 16, 2015 (EP) .................................. 15275174

(51) Int. Cl.
*G05B 19/414* (2006.01)
*G05B 15/00* (2006.01)
*B29C 64/393* (2017.01)
*G05B 19/4099* (2006.01)
*B33Y 50/02* (2015.01)
*B33Y 50/00* (2015.01)
(Continued)

(52) U.S. Cl.
CPC .............. *B33Y 50/00* (2014.12); *B23K 26/34* (2013.01); *B23K 26/354* (2015.10);
(Continued)

(58) Field of Classification Search
CPC .......... B22F 10/00; B22F 10/10; B23K 26/34; B23K 26/354; B29C 64/386;
(Continued)

(56) References Cited

U.S. PATENT DOCUMENTS 5,155,324 A  10/1992 Deckard et al.
5,182,715 A   1/1993 Vorgitch et al.
(Continued)

FOREIGN PATENT DOCUMENTS

CN    104148636 A    11/2014
EP    1 993 812 B1    7/2011
(Continued)

OTHER PUBLICATIONS

Netfabb GmbH, "netfabb Professional 6.0 and netfabb Enterprise 6.0 User manual", Jun. 1, 2015 (Year: 2015).*
(Continued)

*Primary Examiner* — Yuhui R Pan
(74) *Attorney, Agent, or Firm* — Oliff PLC

(57) ABSTRACT

A device and method for generating scan data and/or slice data for use in an additive manufacturing process, in which an energy beam is scanned across layers of flowable material to consolidate the material in a layer-by-layer manner to build a part. The device includes a display and a processor. The processor is arranged to determine scan data for slices and/or slices of the part to be built in the additive manufacturing process and cause the display to display scan data and/or slices that has been determined whilst determining scan data for other ones of the slices and/or other ones of the slices from the geometric data.

31 Claims, 10 Drawing Sheets

(51) Int. Cl.
  *B29C 64/386* (2017.01)
  *B33Y 30/00* (2015.01)
  *B23K 26/354* (2014.01)
  *B23K 26/34* (2014.01)
  *B33Y 10/00* (2015.01)

(52) U.S. Cl.
  CPC .......... *B29C 64/386* (2017.08); *B29C 64/393* (2017.08); *B33Y 30/00* (2014.12); *G05B 15/00* (2013.01); *G05B 19/4099* (2013.01); *G05B 19/414* (2013.01); *B33Y 10/00* (2014.12); *B33Y 50/02* (2014.12); *G05B 2219/49007* (2013.01)

(58) Field of Classification Search
  CPC ....... B29C 64/393; B33Y 10/00; B33Y 30/00; B33Y 50/00; B33Y 50/02; G05B 15/00; G05B 19/4099; G05B 19/414; G05B 2219/49007; Y02P 10/25
  See application file for complete search history.

(56) References Cited

U.S. PATENT DOCUMENTS

| | | | |
|---|---|---|---|
| 2005/0142024 A1 | 6/2005 | Herzog | |
| 2008/0241392 A1 | 10/2008 | Dimter et al. | |
| 2015/0045928 A1* | 2/2015 | Perez | B29C 64/112 700/110 |
| 2015/0328839 A1* | 11/2015 | Willis | G05B 19/4099 700/98 |
| 2016/0059352 A1* | 3/2016 | Sparks | B33Y 30/00 219/76.14 |

FOREIGN PATENT DOCUMENTS

| | | |
|---|---|---|
| JP | 2008-307895 A | 12/2008 |
| WO | 2010/007396 A1 | 1/2010 |
| WO | 2014/207454 A1 | 12/2014 |

OTHER PUBLICATIONS

"Netfabb Professional 6.0 and netfabb Enterprise 6.0," Jun. 1, 2015, Netfabb GmbH, XP-002752497,[http://www.netfabb.com/manuals_download.php].

Jan. 25, 2016 Extended Search Report issued in European Patent Application No. 15275174.9.

Oct. 25, 2016 International Search Report issued in International Patent Application No. PCT/GB2016/051635.

Oct. 25, 2016 Written Opinion of the International Searching Authority issued in International Patent Application No. PCT/GB2016/051635.

* cited by examiner

DEVICE AND METHOD FOR GENERATING AND DISPLAYING DATA RELATING TO AN ADDITIVE MANUFACTURING PROCESS

SUMMARY OF INVENTION

This invention concerns a device and method for generating and displaying data relating to an additive manufacturing process. The invention has particular application to devices and methods for generating and displaying slices of a part to be built and scan paths and scan parameters defining scans of a laser and/or electron beam in an additive manufacturing process.

BACKGROUND

Additive manufacturing or rapid prototyping methods for producing parts comprise layer-by-layer solidification of a flowable material, such as a metal powder material, using an energy beam, such as a laser beam. A powder layer is deposited on a powder bed in a build chamber and a laser beam is scanned across portions of the powder layer that correspond to a cross-section (slice) of the part being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one part can be built, the parts spaced apart in the powder bed.

Usually, a part is not built directly onto a build plate but is supported on the build plate by a series of support structures. For example, the support structures may be a series of cones extending from the build plate to the undersurface of the part. These support structures help to fix the solidified material to the base plate, prevent warping of the part during the build and allow the part to be more easily separated from the build plate on completion of the build.

To control the apparatus a set of instructions are generated from geometric data, such as CAD of STL file formats, defining the part. Generation of the instructions may comprise determining cross-sections (slices) of the part corresponding to areas to be melted or sintered in each powder layer and how the energy beam is to be scanned across the powder layers to melt or sinter the powder to form the slices. Software, such as Magics of Materialise NV, include operations for slicing a part defined in a StereoLithography/Standard Tessellation language (STL) file format to identify slices of the part to be built in the powder layer and for defining scan paths and scan parameters for the laser beam.

The strategy used for scanning the energy beam can affect the thermal loads generated during the build and accuracy with which material is solidified. Excessive, unrestrained thermal loads created during the build cause warping and/or curling of the part being built.

U.S. Pat. No. 5,155,324 describes a scan strategy comprising scanning an outline (border) of a part cross-section followed by scanning an interior (core) of the part cross-section. Scanning a border of the part may improve the resolution, definition and smoothing of surfaces of the part.

U.S. Pat. No. 5,155,324 and US2008/0241392 A1 describe scanning an area in a plurality of parallel scan paths (hatches). (Referred to herein as a "meander scan"). The direction of the scan paths are rotated between layers to homogenise tensions generated during the build. US2008/0241392 A1 extends this concept to scanning in a series of parallel stripes, wherein each stripe consists of a plurality of parallel scan path (hatches) running perpendicular to a longitudinal direction of the stripe. (Referred to herein as a "stripe scan"). US2008/0241392 A1 also discloses the stripes covering partial regions (commonly squares) of the area to be solidified, wherein the hatches of adjacent partial regions are at 90 degrees to each other. (Referred to herein as a "checkerboard scan")

US2005/0142024 discloses a scan strategy for reducing thermal loads comprising successively irradiating individual areas of a layer, which are at a distance from one another that is greater than or at least equal to a mean diameter of the individual areas. Each individual area is irradiated in a series of parallel scan paths (hatches).

Determining acceptable slices, scan paths and scan parameters often requires a combination of automated determination of the slices, scan paths and scan parameters and user input. The user may wish to review the determined slices and scan paths in order to identify potential problems that may occur in the build. For example, the user may wish to review the slices to determine whether regions, such as overhang regions, are adequately supported or review scan paths for errors or for the distance between fill scans and border scans to determine whether there are sufficient, too few or too many border scans. The user may wish to carry out the review in critical portions of the part, such as a portions comprising fine structures.

A problem with the current software is that the process for automatically determining slices/scan paths can take a long time, in some instances hours, and the user must wait until the end of the process before reviewing the slices/scan paths.

SUMMARY OF INVENTION

According to a first aspect of the invention there is provided a device for generating scan data for use in an additive manufacturing process, in which an energy beam is scanned across layers of flowable material to consolidate the material in a layer-by-layer manner to build a part, the device comprising a display and a processor, the processor arranged to determine scan data for slices of the part to be built in the additive manufacturing process and cause the display to display scan data that has been determined for at least one of the slices whilst the scan data for other ones of the slices is being determined.

In this way, the user can review the scan data for a slice/slices before the scan data has been determined for all the slices. This may reduce the time it takes for the user, with the help of the device, to determine acceptable scan data for the build.

The device may comprise a user input and the processor may be arranged to receive a selection of at least one slice from the user input, wherein, in response to receiving the selection, the processor determines the scan data for the slices in an order such that scan data for the at least one selected slice is displayed on the display whilst the scan data for other ones of the slices is being determined.

Consequently, the user can select slices that he/she wants to review and the processor will determine a suitable order, such as preferentially determining scan data for the selected slice, such that the user can review the scan data for the selected slice during a period in which scan data for the other ones of the slices is being determined.

The processor may be arranged to, in response to receiving the selection of the at least one slice, modify a predetermined sequence of slices for which scan data is determined based upon the selection of the at least one slice. The predetermined sequence may be to determine scan data for the slices in order from the uppermost slice of the part to the lowermost slice of the part or vice-versa. Modification of the predetermined sequence based upon the selection of the at least one slice may to interrupt the sequence in favour of determining the scan data for the at least one selected slice. The predetermined sequence may be resumed once scan data for the at least one slice has been determined or a further (different) sequence may be begun based upon the at least one selected slice. For example, in the latter case, the further sequence may be to determine scan data for the slices in an order from the at least one selected slice, for example in order downwards from the at least one selected slice, in order upwards from the at least one selected slice or alternately for slices either side (above and below) of the at least one selected slice starting with the slices closest to the at least one selected slice. It will be understood that in the case where the predetermined sequence is resumed, the predetermined sequence is resumed to determine scan data for slices taking into account that scan data for the at least one selected slice has been determined out of sequence. A further (different) sequence is a sequence that determines the scan data for unselected slices in an order different to that of the predetermined sequence when disregarding the changes to the sequence necessitated from determining the scan data for the at least one selected slice out of sequence.

Selection of the at least one slice may comprise a selection of a plurality of consecutive slices. For example, the user may select a primary slice and a number of slices one or both sides of the primary slice, the processor arranged to determine the scan data for the plurality of selected slices before recommencing the predetermined sequence or beginning the further sequence. The number of slices may be a predefined number or may be input by the user together with an identity of the primary slice.

The processor may be arranged to determine scan data for the slices in an order that the slices are built in an additive manufacturing process and cause the display to display scan data that has been determined for at least one of the slices whilst the scan data for the other slices, above the at least one slice, is being determined. The processor may be arranged to display scan data corresponding to a scan currently being carried out by an energy beam of the additive manufacturing apparatus, whilst determining scan data for other slices above the slice being formed by the scan.

The scan data determined may be for a single continuous path, a plurality of discrete paths or a series of discrete points to be exposed to the energy beam, such as a laser or electron beam, in a specified order. The scan data may comprise data that defines a scan/scans of the energy beam across the slice, such as scan paths and scan parameters. The scan parameters may be scan speed, spot diameter, spot shape, point distance for discrete points, point exposure time, scan pattern (including hatch distance and patterns, such as checkerboard, stripe and meander patterns) and/or energy beam power. A plurality of scan parameter sets may be predetermined and the processor may be arranged to identify which scan parameter set to use for each area of each slice. For example, the processor may be arranged to identify areas of the slice that overhang the previous slice and use a different parameter set for the overhanging area compared to a non-overhanging area of the slice. The processor may be arranged to determine the scan paths for each slice. The scan paths may be determined based on the scan parameters.

The scan data may comprise predicted values for an effect of the scan of the energy beam in accordance with the determined scan path and scan parameters. For example the values may comprise a predicted energy input into different regions of the slice and/or predicted porosity of material solidified by the scan to form the slice.

The predicted values may comprise a temperature profile of the selected slice during solidification of material with the energy beam to form the selected slice. The processor may be arranged to resolve a thermal model to predict temperatures of a slice during the build from the scan paths and scan parameters determined for the selected slice and known material properties. A thermal model for the selected slice may be resolved based upon scan paths and scan parameters determined for the selected slice and scan paths and scan parameters determined for a predetermined number, but not all, of the slices below the selected slice. Accordingly, the processor may be arranged to determine scan parameters for a number of slices below the selected slice in order to determine predicted temperatures for the selected slice.

The influence of temperature differences across lower slices on the temperatures achieved on the selected slice will diminish the further the lower slices are from the selected slice. Accordingly, it may be possible to accurately model the temperatures across the selected slice based upon the scan parameters for fewer than all of the slices below the selected slice. The processor may be arranged to display a temperature profile of the at least one selected slice to the user whilst scan data for other ones of slices is being determined.

The predicted values may be time-dependent values, for example predicted values for how a temperature profile of the selected slice varies with time.

The processor may be arranged to receive modified scan instructions from the user whilst determining scan data for the slices and re-determine scan data for at least one of the slices based upon the modified scan instructions. The modified scan instructions may comprise a change in the scan parameters. For example, the user may decide to change a scan pattern upon reviewing the scan data for the selected slice. A change in the scan pattern may comprise a change in a number of border scans, a size of a square of a checkerboard pattern or a stripe of a stripe pattern and/or hatch distance.

According to a second aspect of the invention there is provided a method for generating scanning data for use in an additive manufacturing process, in which an energy beam is scanned across layers of flowable material to consolidate the material in a layer-by-layer manner to build a part, the method comprising determining scan data for slices of the part to be built in the additive manufacturing process and causing a display to display the scan data for at least one of the slices whilst determining the scan data for other ones of the slices.

The method may comprise receiving a selection of at least one slice and determining the scan data for the slices in an order based upon the selection such that scan data for the at least one selected slice is displayed whilst the scan data for other ones of the slices is being determined.

The method may comprise determining scan data for the slices in an order in which the slices are built in the additive manufacturing process and causing the display to display scan data that has been determined for at least one of the slices whilst the scan data for the other slices, to be built later in the build, is being determined. The method may comprise building a part using the additive manufacturing process based on the determined scan data and displaying scan data, corresponding to a scan currently being carried out by an energy beam in the additive manufacturing process, whilst determining scan data for other slices to be built later in the additive manufacturing process.

According to a third aspect of the invention there is provided a data carrier having stored thereon instructions, which, when executed by a processor, cause the processor to carry out the method of the second aspect of the invention.

According to a fourth aspect of the invention there is provided a device for generating slice data defining slices of a part to be built in an additive manufacturing process in which an energy beam is scanned across layers of flowable material to consolidate the material to form the part in a layer-by-layer manner, the device comprising a display and a processor, the processor arranged to determine the slices from geometric data defining a part and cause the display to display at least one of the slices whilst other ones of the slices are being determined from the geometric data.

In this way, the user can review the slice/slices before all slices have been determined. This may reduce the time it takes for the user, with the help of the device, to determine acceptable slices for the build.

The device may comprise a user input and the processor may be arranged to receive a selection of a location on the part from the user input, wherein, in response to receiving the selection, the processor determines the slices in an order such that at least one slice coinciding with the selected location is displayed on the display whilst other ones of the slices are being determined. The selected location may be a height on the part, a height in the build containing the part, a location/region of the part and/or a location/region in the build containing the part. A plurality of slices may be encompassed by/coincide with the selected region.

Consequently, the user can select the location on the part that he/she wants to review and the processor will determine a suitable order, such as preferentially determining slices coinciding with the selected location, such that the user can review these slice(s) during a period in which other ones of the slices are being determined.

The processor may be arranged to determine at least two adjacent slices in response to receiving the selected location, at least one of the two adjacent slices coinciding with the selected location. In this way, the user can compare the differences between the adjacent layers, for example to determine whether support is required for overhanging areas of the upper slice.

The processor may be arranged to, in response to receiving the selection of the location, modify a predetermined sequence in which slices are determined based upon the selected location. Modification of the predetermined sequence based upon the selected location may to interrupt the sequence in favour of determining a slice that coincides with the selected location. The predetermined sequence may be resumed once slice(s) coinciding with the selected location has/have been determined or a further (different) sequence may be begun based upon the at least one selected location. For example, in the latter case, the further sequence may be to determine slices in an order from the at least one selected location, for example in order downwards from the at least one selected location, in order upwards from the at least one selected location or alternately for slices either side (above and below) of the selected location starting with the slices closest to the selected location. It will be understood that in the case where the predetermined sequence is resumed, the predetermined sequence is resumed to determine slices taking into account that the slices that have been determined out of sequence. A further (different) sequence is a sequence that determines the slices in an order different to that of the predetermined sequence when disregarding the changes to the sequence necessitated from determining the slices out of sequence.

The processor may be arranged to provide means for healing (fixing) a contour of a determined slice whilst determining other ones of the slices. In particular, it is possible that the geometric data inadequately defines surfaces of the part for the determination of the slices. For example, this may result in a slice with an open contour. The processor may be arranged to automatically identify a slice that requires healing and cause the display to display the slice that requires healing whilst determining other ones of the slices. The processor may be arranged to receive a repair input from the user indicating how to heal the slice and the processor may be arranged to heal the slice based on the repair input. For example, the repair input may indicate how to fix a contour of the slice. The processor may be arranged for receiving the repair input and, optionally, healing the slice, whilst determining other ones of the slices.

The processor may be arranged to determine slices in an order that the slices are built in an additive manufacturing process and cause the display to display at least one of the slices whilst the scan data for the other slices, above the at least one slice, are being determined. The processor may be arranged to display slices corresponding to a scan currently being carried out by an energy beam of additive manufacturing apparatus, whilst determining slices above the slice being formed by the scan.

According to a fifth aspect of the invention there is provided a method for generating slice data defining slices of a part to be built in an additive manufacturing process in which an energy beam is scanned across layers of flowable material to consolidate the material to form the part in a layer-by-layer manner, the method comprising determining the slices from geometric data defining a part and causing a display to display at least one of the slices whilst determining other ones of the slices from the geometric data.

The method may comprise receiving a selection of a location on the part and determining the slices in an order based upon the selected location such that a slice coinciding with the selected location is displayed whilst other ones of the slices are determined.

The method may comprise determining slices in an order in which the slices are built in the additive manufacturing process and causing the display to display a slice that has been determined whilst the other slices, to be built later in the build, are being determined. The method may comprise building a part using the additive manufacturing process based on the determined slices and displaying a slice, corresponding to a scan currently being carried out by an energy beam in the additive manufacturing process, whilst determining other slices to be built later in the additive manufacturing process.

According to a sixth aspect of the invention there is provided a data carrier having stored thereon instructions, which, when executed by a processor, cause the processor to carry out the method of the fifth aspect of the invention.

According to a seventh aspect of the invention there is provided a device for displaying scan data for use in an additive manufacturing process, in which an energy beam is scanned across layers of flowable material to consolidate the material in a layer-by-layer manner to build a part, the device comprising a user input, a display and a processor, the processor arranged to receive user inputs of a selected slice and selected time, to obtain scan data for the selected slice, the scan data including time-dependent values for an effect of the scan and to cause the display to display a graphical representation of the values corresponding to the selected slice and the selected time.

The device provides the user with a way of viewing a selected slice at different times such that the user can analyse how time-dependent values, such as temperature and/or stress, change as the build progresses.

The processor may be arranged to cause the display of at least one graphical control element that can be manipulated by the user with a pointing device to select a slice and/or time. The at least one graphical control element may comprise at least one graphical element, such as a slider, which can be slid to different locations to select different slices and/or times. The different locations may be different locations along a path graphically depicted on the display. The path may be graphically represented as a slide bar.

Preferably, the at least one graphical control element comprises two graphical control elements, a first graphical control element for selecting a slice and a second graphical control element for selecting a time. The first and second graphical control elements may comprise two sliders, one of which can be slid along a path to select a slice and the other of which can be slide along a path to select a time.

According to an eighth aspect of the invention there is provided a computer implemented method for displaying scan data for use in an additive manufacturing process, in which an energy beam is scanned across layers of flowable material to consolidate the material in a layer-by-layer manner to build a part, the method comprising receiving user inputs of a selected slice and selected time, obtaining scan data for the selected slice, the scan data including time-dependent values for an effect of the scan and causing the display to display a graphical representation of the values corresponding to the selected slice and the selected time.

According to a ninth aspect of the invention there is provided a data carrier having stored thereon instructions, which, when executed by a processor, cause the processor to carry out the method of the fifth aspect of the invention.

According to a tenth aspect of the invention there is provided a device for determining effects of a scan in an additive manufacturing process, in which an energy beam is scanned across layers of flowable material to consolidate the material in a layer-by-layer manner to build a part, the device comprising a processor arranged to receive a user input of a selected slice, to obtain scan data for each of the selected slice and a set number of slices below the selected slice, the set number being less than a total number of slices below the selected slice, the scan data including data defining a scan path and scan parameters for the scan of the energy beam to form the slice, and to determine predicted temperatures and/or stresses of the selected slice during the scan based upon scan data obtained for the selected slice and the set number of slices.

Limiting the scan data that is taken into account to the set number of slices below the selected slice may reduce the time is takes to resolve a thermal and/or stress model without impacting on the accuracy of the predicted temperatures and/or stresses. In particular, the influence on temperature and/or stress of scan data for a slice below the selected slice diminishes the further the slice is away from the selected slice. It may be reasonable to assume that each slice a certain number of slices below the selected slice has had sufficient time to cool to even out any variations in temperature/stress that were generated when the slice was initially formed. Accordingly, a temperature across such a distant slices can be considered to be homogenous such that the scan data for the distant slice does not have to be taken into account when determining predicted temperatures and/or stresses for the selected slice.

The processor may be arranged to receive a user selection of the set number of slices. Alternatively, the processor may select the set number of slices based on other information that is made available, such as the material being processed, heating provided in the additive manufacturing apparatus, expected rate of cooling of the material and/or expected average temperature of the flowable material bed.

According to a eleventh aspect of the invention there is provided a computer-implemented method for determining effects of a scan in an additive manufacturing process, in which an energy beam is scanned across layers of flowable material to consolidate the material in a layer-by-layer manner to build a part, the method comprising receiving a user input of a selected slice, obtaining scan data for each of the selected slice and a set number of slices below the selected slice, the set number being less than a total number of slices below the selected slice, the scan data including data defining a scan path and scan parameters for the scan of the energy beam to form the slice, and predicting temperatures and/or stresses of the selected slice during the scan based upon scan data obtained for the selected slice and the set number of slices.

According to a twelfth aspect of the invention there is provided a data carrier having stored thereon instructions, which, when executed by a processor, cause the processor to carry out the method of the ninth aspect of the invention.

The data carrier of the above aspects of the invention may be a suitable medium for providing a machine with instructions such as non-transient data carrier, for example a floppy disk, a CD ROM, a DVD ROM/RAM (including-R/-RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF THE DRAWINGS

Embodiments of the invention will now be described, by example only, with reference to the accompanying drawings, in which.

DESCRIPTION OF EMBODIMENTS

Figure 1:
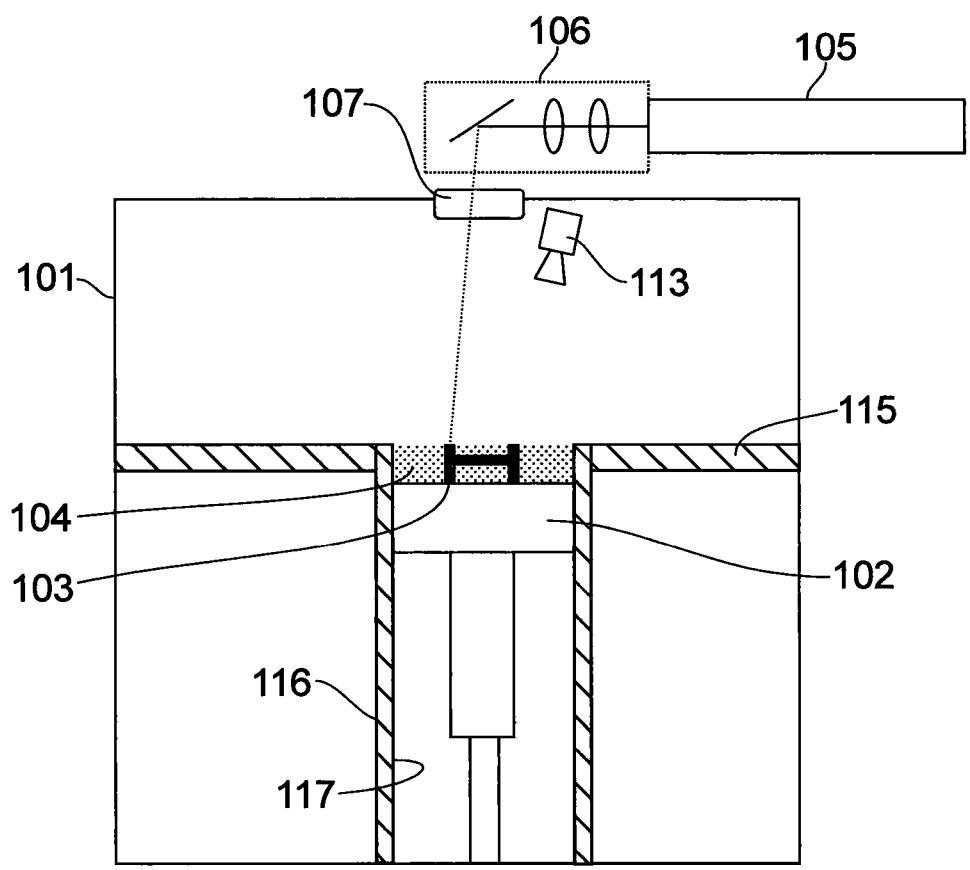
FIG. 1 shows an additive manufacturing apparatus according to an embodiment of the invention.
Figure 2:
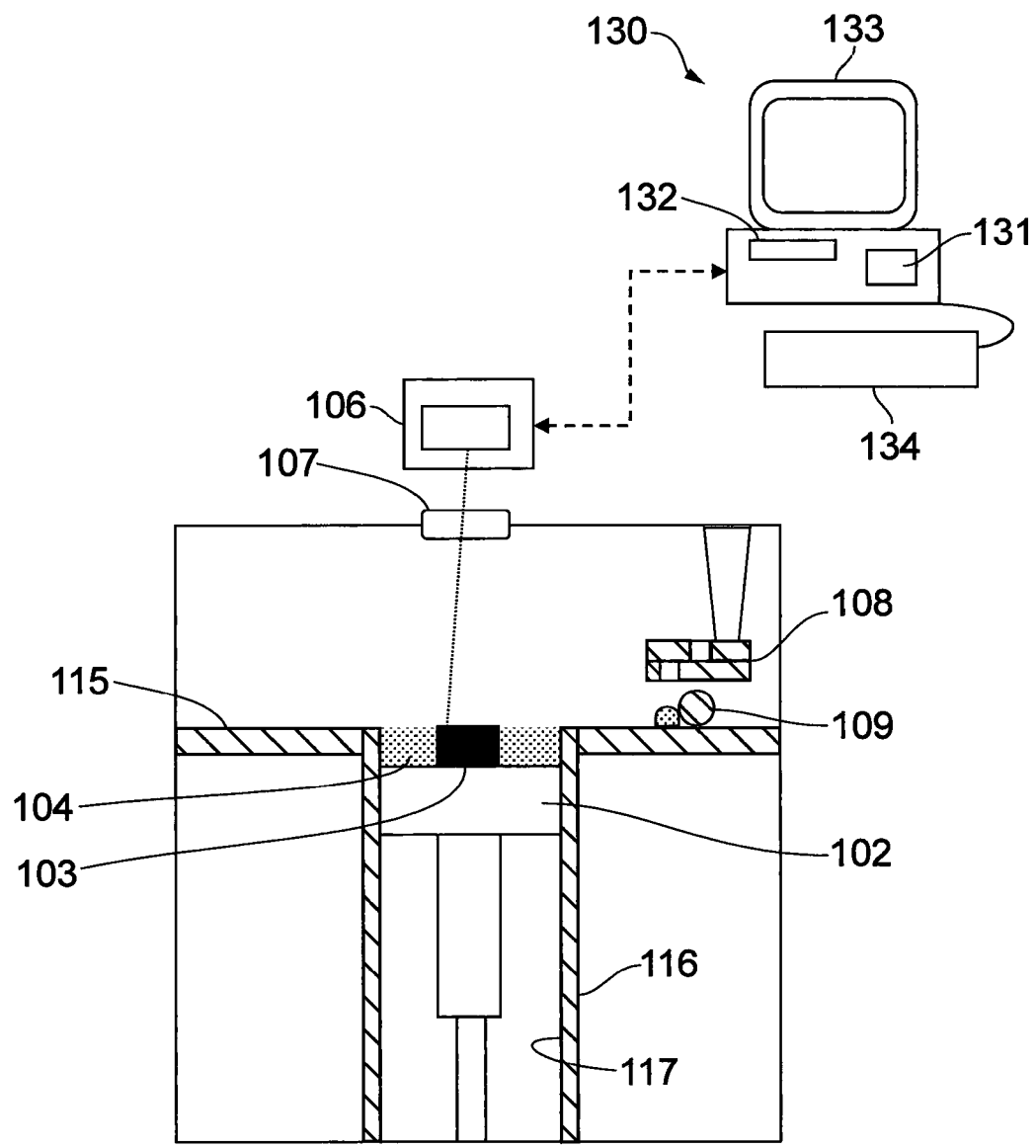
FIG. 2 shows the additive manufacturing apparatus shown in FIG. 1 from a different side.

Referring to FIGS. 1 and 2, an additive manufacturing apparatus, in this embodiment laser solidification apparatus, comprises a main chamber 101 having therein partitions 115, 116 that define a build chamber 117 and a surface onto which powder can be deposited. A build platform 102 is provided for supporting a part 103 built by selective laser melting powder 104. The platform 102 can be lowered within the build chamber 117 as successive layers of the part 103 are formed. A build volume available is defined by the extent to which the build platform 102 can be lowered into the build chamber 117. Layers of powder 104 are formed as the part 103 is built by dispensing apparatus 108 and a wiper 109. For example, the dispensing apparatus 109 may be apparatus as described in WO2010/007396. A laser module 105 generates a laser for melting the powder 104, the laser directed as required by optical module 106 under the control of a computer 130. The laser enters the chamber 101 via a window 107.

The apparatus comprises an infra-red camera 113 for capturing infra-red pictures of the working surface (top powder layer) during the build.

Computer 130 comprises a processor 131, memory 132, display 133, user input device 134, such as a keyboard, touch screen, etc., and data connections to modules of the laser melting unit, such as optical module 106 and laser module 105. Stored on memory 132 is a computer program that instructs the processing unit to carry out the method as now described.

Typically, a part to be built will be designed in appropriate software, such as CAD. In such a software design package, the part is usually defined in a way that is unsuitable for use in determining slices to be formed during the additive manufacturing process, scan paths and scan parameters for the laser when scanning a powder layer to form the slice. To determine a scan path, it may only be necessary to consider the bounds of the part, making a format that defines the surface geometry of the part, such as an STL file, a suitable format for defining the part. Accordingly, as a first step the CAD data is converted into an STL format. A suitable conversion program may be provided on computer 130 or such a conversion may be carried out remote from the system. Conversion of the CAD file into an STL file may require fixing of the data to ensure that is meets certain requirements for use in determining sections and a scan path. For example, ill-defined regions in the surfaces may have to be fixed. The fixing of the data can be done using conventional software. The part defined in the STL file is imported into the computer program stored on computer 130.

For a single build in an additive manufacturing machine, it is common to build a plurality of parts together. For designing such a build, a plurality of parts may be imported, such as in the form of STL files, into an application program running on computer 130 or a single part may be imported and copies of the part made in the application program. In either case, data is provided defining a surface geometry of a plurality of parts.

Figure 3:
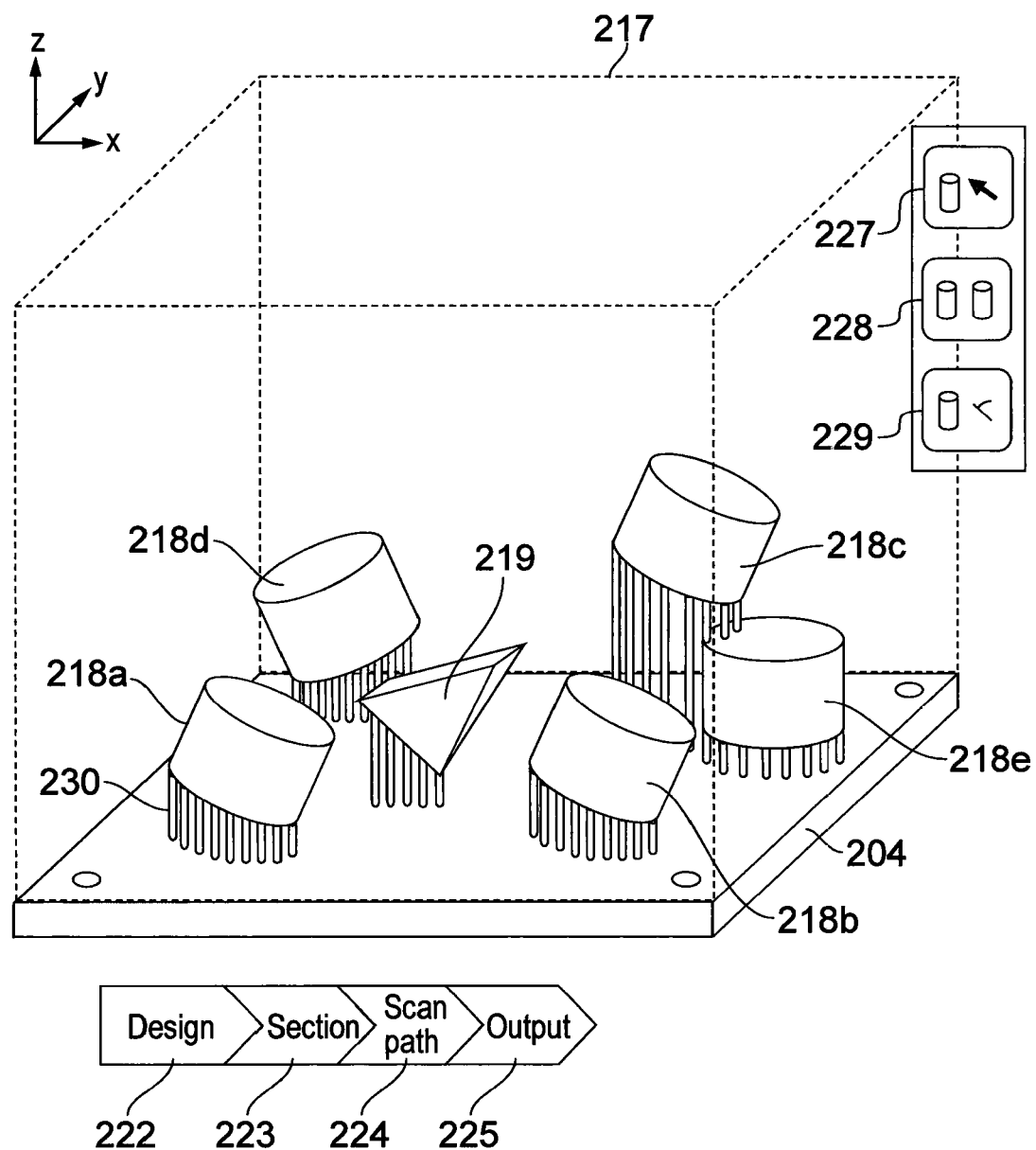
FIG. 3 shows a user interface comprising a graphical representation of parts with supports to be built in an additive manufacturing process.

A user interface of an application program is shown in FIG. 3. Such a user interface may be displayed on display 133. The user interface comprises a graphical depiction of the build platform 204 and the available build volume 217. Parts 218a, 218b, 218c, 218d and 218e have been imported into the application program. The user interacts with the computer 130 through the input device 134 to orient and locate each part 218a, 218b, 218c, 218d, 218e and 219 in the build volume 217.

There are four stages in the build process, design, sectioning, determining a scan path/scan parameters and outputting the data for controlling the build. The user can toggle between each stage for each part by selecting the part and then selecting icons/graphical buttons 222, 223, 224 and 225 with a pointing device or by touching a touch screen. Accordingly, different parts can be at different stages of the design process. The buttons 222 to 225 may change colour or otherwise change appearance to indicate to the user the stage of the process that has been selected for a particular part.

In the design phase, a user can locate and orient the part(s) in the build volume 217. This may be achieved using a pointing device/touch to select a part and appropriate combinations of button/key operations and movement of the pointer/finger to orient and locate the part. Once the user is happy with the orientation and location of the part in the build volume, the user can select part(s) and then the "Section" button 223, which will cause the processing unit 131 to slice the part(s) and any supports into slices to be built in the layer-by-layer selective laser melting process. By toggling to this stage, the orientation and, possibly, also the location, of the selected parts may become fixed, the user having to toggle back to the "Design" stage to change the orientation and location. Re-orientation of the part will require the part to be re-sliced and it is likely that the time it takes to slice a part with a conventional desk-top computer (typically tens of seconds, although it will depend on the shape and size of the part) will be too long to provide a user friendly experience if re-slicing was carried out in real-time with re-orientation of the part. However, suitably fast computers may be able to carry real-time re-slicing of the part within an acceptable time period such that re-slicing of the part in "real-time" with changes in orientation may provide an acceptable user experience. In such a scenario, it would not be necessary to lock in the orientation of the part when the user toggles to the sectioning stage. Rotational orientation of a part about the z-axis and location of a part do not affect the sectioning on the part. Accordingly, in one embodiment, the user is able to alter these attributes after the slicing operation.

The user can then select one or more parts that are at the "Section" stage and toggle to the scan path stage using button 224. During this stage, the processing unit 131 determines a scan path and possibly, also the scan parameters, for the laser when forming each section of the selected part(s) and supports. The scan parameters may be preselected by the user, selected based on the material or the processing unit 131 may select a parameter set form a plurality of predefined parameter sets based on analysis of the geometry of the part or the type of scan path. For example, different parameter sets may be used for areas of a slice that overhang the slice below compared to non-overhanging areas or for border (hull) and core scans.

In a final stage, the scan path and other geometric data is output to the laser solidification apparatus for controlling build of the part. The user activates this operation by selecting button 225.

During the design, sectioning and scan path stages, the user can generate supports 230 for supporting the part(s) during the build. Icons/graphical buttons 227, 228, 229 are provided for the user to create supports.

Figure 4A:
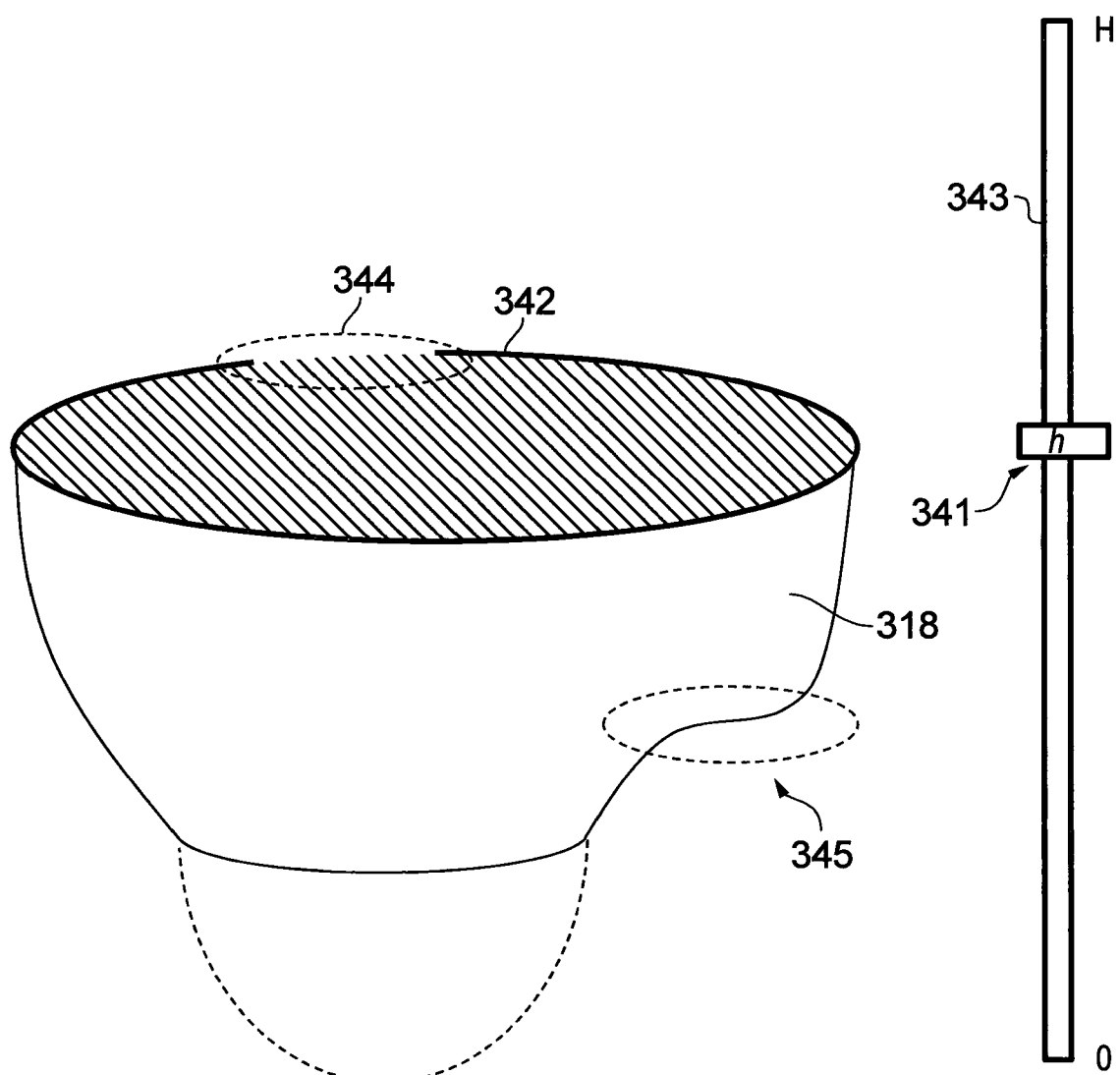
FIG. 4a shows a graphical user interface for the user selection of a location on the part for the determination of slices.

FIG. 4a shows a display of a graphical user interface that allows a user to select a height of the part for the generation of slices from geometric data defining the surfaces of the part, such as defined in STL data. The graphical user interface may be displayed to the user before and during determination of slices. The user can slide slider 341 along slide bar 343 to select a location, in this embodiment, height, h, on a part 318. In response, the processor 131 causes the display to displays a two-dimensional slice for that selected height. If the Section stage 233 has been commenced to determiner slices of the part to be built in the additive manufacturing process, the user can select to review slices before all of the slices have been determined. If the order in which the slices are determined means that the slice at the selected height the user wants to review has yet to be determined, the predetermined order is interrupted and the slice at that height is determined. In this embodiment, the part is displayed with the portion of the part above the selected height not shown to enable the user to view the slice at the selected height. Slices adjacent to the slice determined for the selected height are then determined and then the next nearest slices and so on.

The graphical representation of the part 318 may provide an indication of a region of the part 318 for which slices have been determined. In FIG. 4a, a region of the part 318 for which slices have been determined is shown in solid lines and a region of the part for which slices have yet to be determined is shown in dotted lines.

The user can vary the slice that is being viewed by moving the slider 341.

The displayed slice may have a contour 342 that is ill-defined (such as not being a closed contour as indicated by the gap 344) as a result of inadequate definition of the surface of the part in the STL file. The graphical interface may provide tools (not shown) for the user to indicate how the ill-defined contour 342 should be fixed. Alternatively or additionally, the processor 131 may be arranged to automatically determine a fix for the ill-defined contour 342. The fix may be displayed to the user to allow the user to review the fix and confirm that he/she is happy for the build to go ahead with then contour fixed in this manner.

The user may also wish to review the slices to identify overhanging areas, such as 345, that require supports. The system allows the user to review slices that include the overhang 345 and design supports whilst the processor it determining slices for other regions of the part.

Figure 4B:
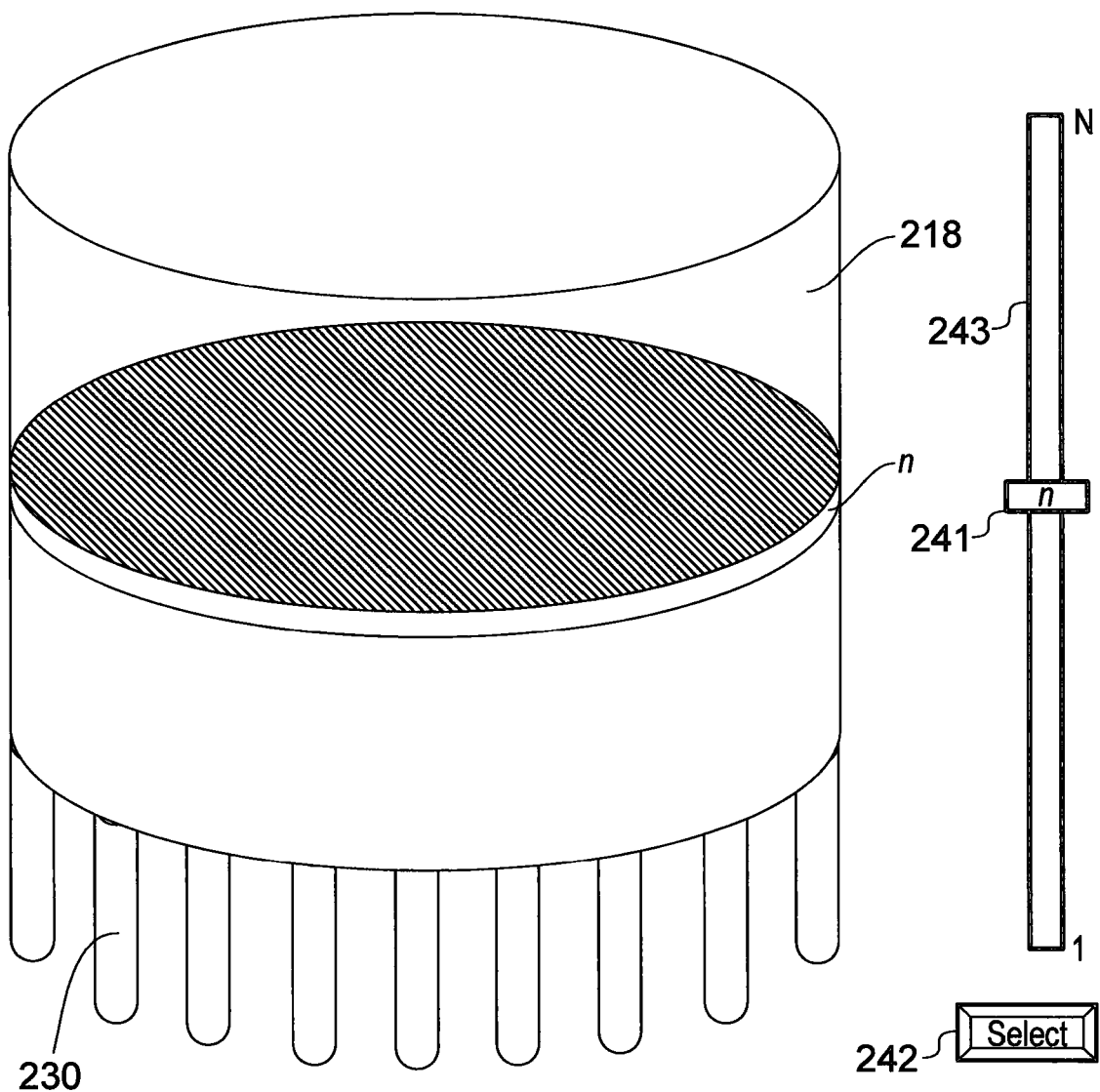
FIG. 4b shows a graphical user interface for the user selection of slices for a review of scan data.

FIG. 4b shows a display of a graphical user interface that allows a user to select slices 1 to N for review of scan data. The graphical user interface may be displayed to the user as soon as the processor 131 has determined the slices and during the Scan Path stage in which scan data, such as the scan paths, are determined for the slices.

In this embodiment, the graphical user interface comprises a depiction of a selected part 218 of the build and a graphical control element, in this embodiment a slider bar 243 and slider 241, with which the user can interact using the user input device, such as a pointing device, to select a slice or slices for review. By moving the slider 241 along the slide bar 243, the user can select a layer, n, for review. The depiction of the part 218 adjacent the slider 243 may be updated to show layer, n, as the user moves the slider 241.

If the Scan Path stage has been commenced, the user can select to review the scan data determined for selected slices before scan data has been determined for all of the slices 1 to N. To select a slice, n, for review, the user selects button 242 with the pointing device when the slide 241 is positioned at the location for slice, n. The selection to review the scan data for a slice takes the user to a graphical depiction of the scan data, such as the one shown in FIG. 5a.

Commencement of the Scan Path process by the user will cause processor 131 to determine scan data for the slices in a predetermined sequence. In this embodiment, the predetermined sequence is to start the determination of scan data for the uppermost slice, N, and progress downwards slice-by-slice. It will be understood, however, that other predetermined sequences for determining scan data could be used.

The manner in which the laser beam is scanned across a powder layer to form a slice of the part is dependent on scan parameters comprising the scanning strategy, spot size, laser power, point distance and point exposure time. The processor 131 determines the scan paths for the laser beam to take in forming the slice in a powder layer based upon the scan parameters and the shape of the slice. The direction of the scan paths may be rotated between layers, for example as described in U.S. Pat. No. 5,155,324 and EP1993812.

Selection of a slice, n, for review during execution of the sequence to determine scan data for the slices, causes the processor 131 to determine the scan data for the selected layer, n, if the scan data has not been determined already, even if this requires interruption of the predetermined sequence.

Once the scan data has been determined, the scan data is displayed to the user. The scan data for the selected slice is displayed whilst the processing unit 131 determines scan data for other ones of the slices. In this embodiment, after determining scan data for the selected slice, n, the processor 131 determines scan data for an adjacent slice, n−1 or n+1. After this, the processor 131 determines scan data for the other adjacent slice n+1 or n−1 to the selected slice, n. The processor 131 then determines scan data for the next nearest slices and so on until scan data has been determined for all slices or the user selects a further slice for review for which scan data has yet to be determined. If the user selects to view such a further slice then the scan data is determined and displayed for the newly selected slice and the newly selected slice is used as the basis for scheduling the order in which scan data is determined for slices, in the same manner as described above with respect to selected slice n, taking into account the slices for which scan data has already been determined.

Figure 5A:
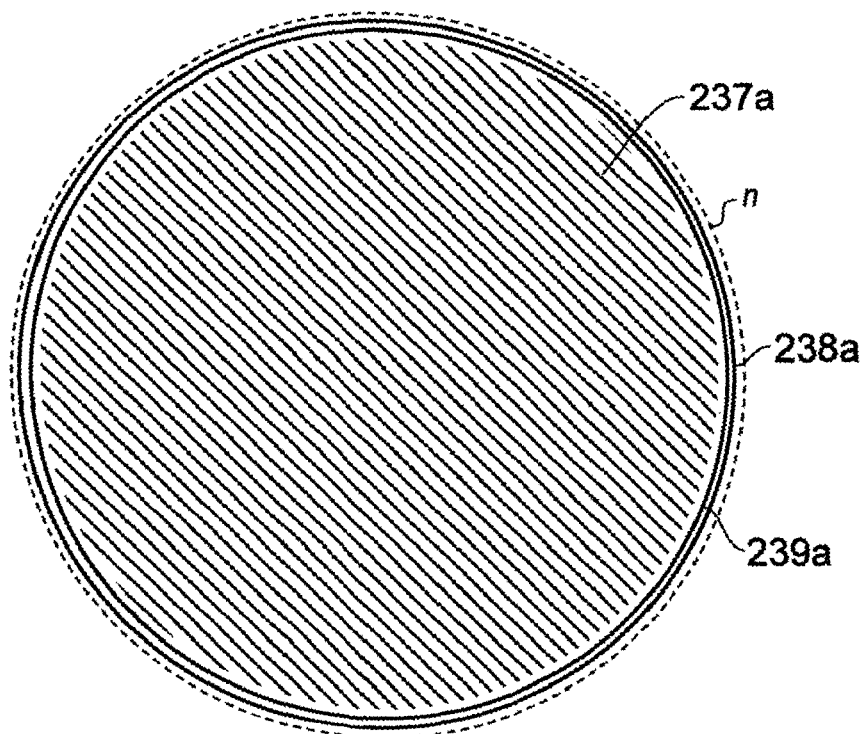
FIGS. 5a and 5b illustrate scan paths determined for different slices of the part.

FIG. 5a shows a display of scan data for a slice n. In this embodiment, the scan strategy comprises a "hull and core" scanning strategy, wherein a core of an area to be solidified is scanned using a meander or raster scan 237a and an outer skin of the area is scanned using a two parallel perimeter (border) scans 238a and 239a. The user is able to select the scan paths, which causes a dialog box (not shown) to appear displaying the parameters for the selected scan path.

Figure 5B:
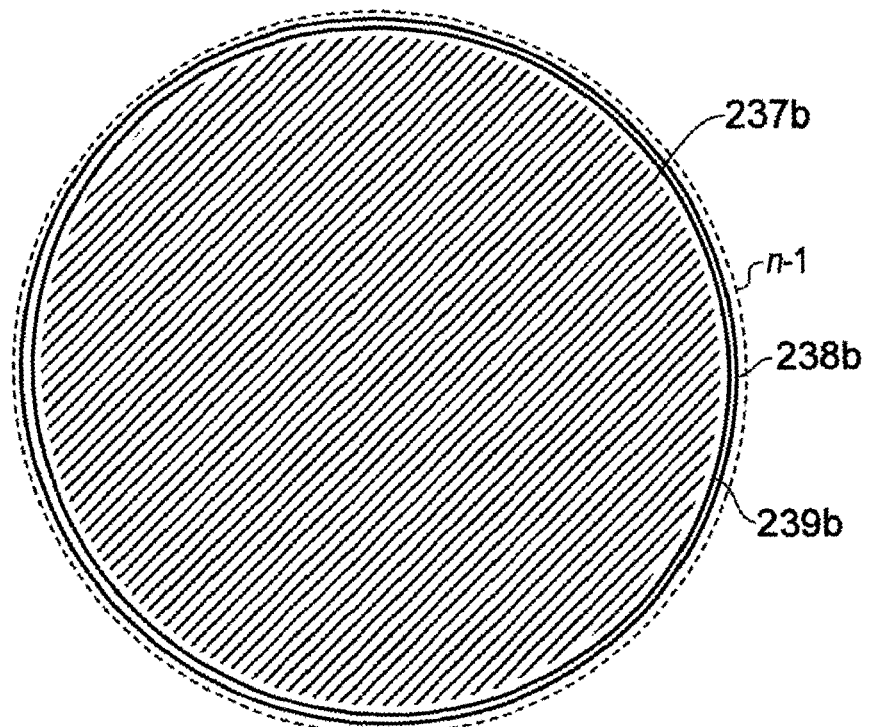

The user is able to scroll through the slices without returning to the display shown in FIG. 4b. FIG. 5b shows the adjacent slice to the one shown in FIG. 5b, with the core scanned with a raster scan oriented in a different direction.

Figure 6A:
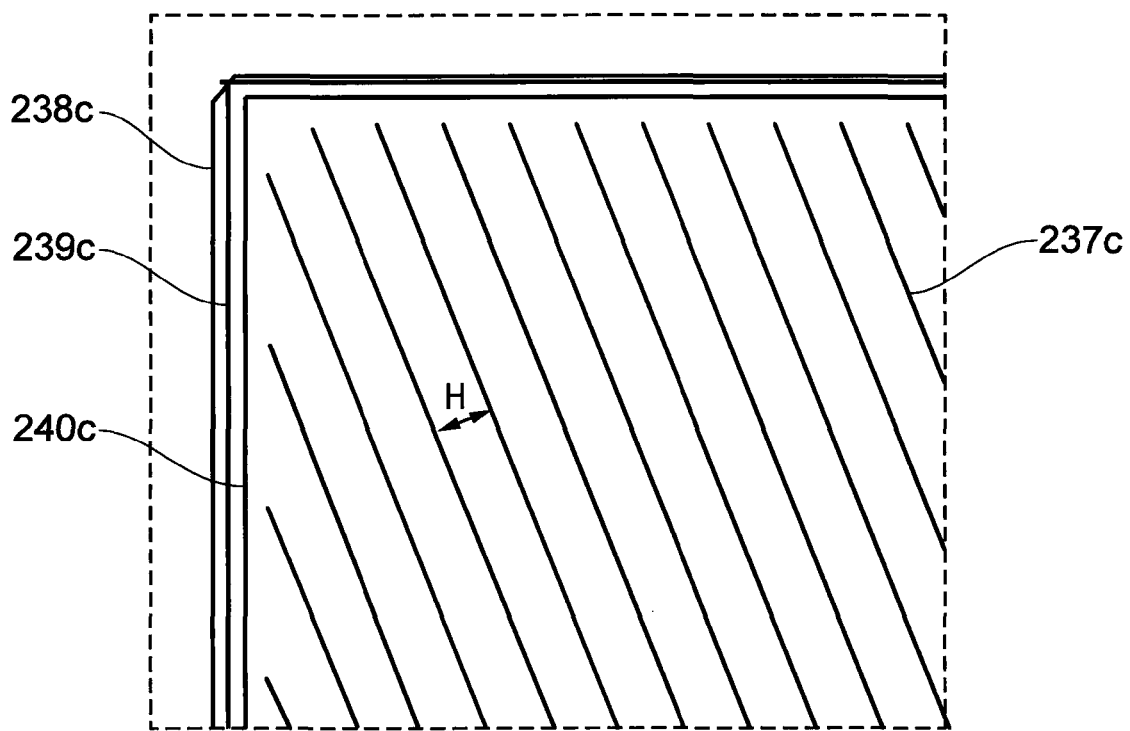
FIGS. 6a and 6b show embodiments of a display of the scan paths for a slice in accordance with the invention.
Figure 6B:
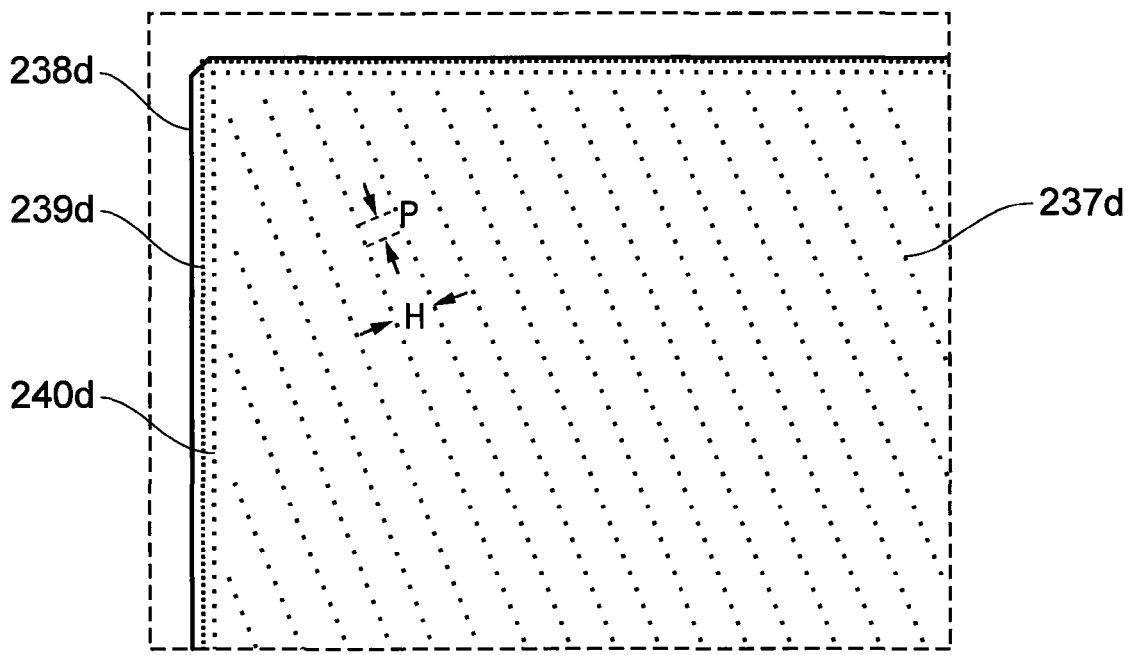

The user can zoom into an area of the slice n to view the scan paths in more detail. Examples of such images are shown in FIGS. 6 and 6b. FIG. 6a shows scan paths 237c, 238c, 239c, 240c wherein all of the scan paths are continuous scans. FIG. 6b shows scan paths 237d, 238d and 239d are scans comprising discrete point exposures and scan path 240d is a continuous scan. A hatch spacing is indicated by arrow, H, and a point distance is indicated by arrow, P.

In this way, the user is able to review the scan data for slices of interest during determination by the processor of scan data for other slices. Furthermore, the processing unit 131 will preferentially determine the scan data for a selected slice to reduce any delay between the user indicating that he/she wants to review the scan data for a slice and display of the scan data.

The processor 131 is arranged to predict values for effects of the scan when forming each slice. The predicted values may be determinable from scan data, such as scan paths and scan parameters, determined for a single slice or such scan data determined for multiple slices. In the latter case, the user is able to specify a number of slices for which such scan data should be considered when determining the values for a selected slice. The predicted values for the selected slice is displayed whilst the processor predicts the corresponding values for other slices. The order in which the values are determined for the other slices may be using a nearest neighbour approach as described above with respect the determining scan paths and scan parameters.

Figure 7A:
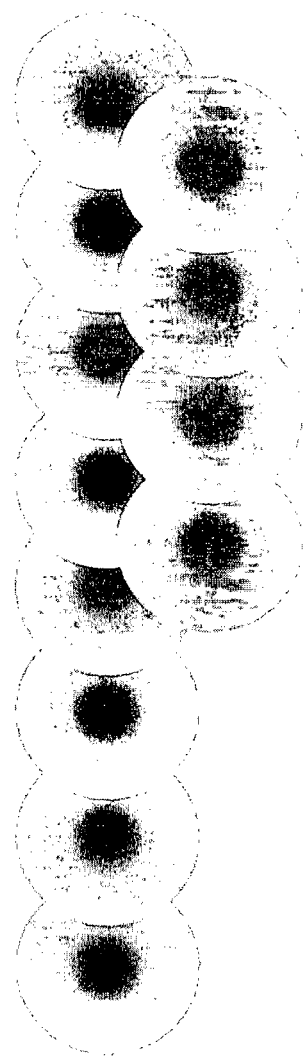
FIGS. 7a and 7b show embodiments of a display representing energy input into a slice.

In one embodiment, the predicted value is the energy input into a slice. For scan paths in which the scan comprises the exposure of a series of discrete points, as shown in FIG. 6*b*, the energy input for each exposure can be calculated from the point exposure time and known distribution of the laser power, which typically has a Gaussian distribution, across the laser spot (which will vary with spot size). The energy input may be represented by an appropriate gradient of colour(s)/shades as shown in FIG. 7*a*. From such a display, the user may be able to determine whether there are any areas of the slice that are not subjected to an energy input above a specified level.

Figure 7B:
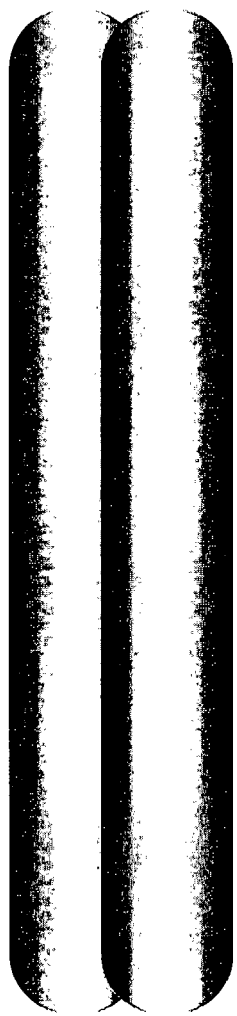

FIG. 7*b* shows a corresponding energy input map for a continuous scan. For such a scan, the energy input may be calculated from a scan speed and known distribution of the laser power across the laser spot (which will vary with spot size).

Figure 8A:
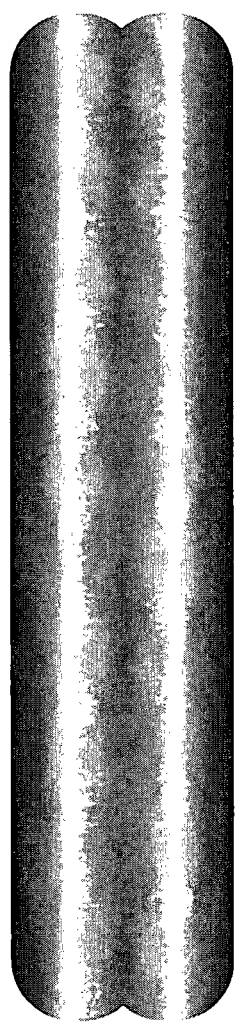
FIGS. 8a and 8b show embodiments of a display representing a porosity probability map for the scan shown in FIG. 7b.
Figure 8B:
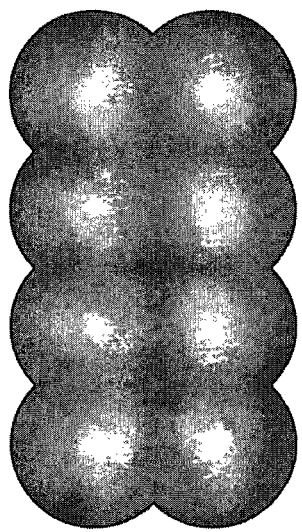

In a further embodiment, in addition to the energy input to a slice, the processor 131 is arranged to predict a porosity of material solidified to form the slice. The probability of solidified material formed by the scan having a density that is 100% of the theoretical density may be predicted from the energy input for each point exposure/line scan and the extent to which it overlaps with other point exposures/line scans. The map may be calculated without taking into account the time between exposures and this may be an acceptable simplification when viewing hatch scans in a checkerboard or stripe scan, wherein the time between exposures for points along adjacent hatches will be approximately equal. FIG. 8*a* shows how the predicted porosity may be graphically presented in a display for a continuous scan and FIG. 8*b* shows how the predicted porosity may be graphically presented in a display for a discrete point scan.

The processor 131 is also arranged to predict a thermal history of the selected slice as the slice is formed and, possibly, as further slices are formed above the selected slice. The processor 131 predicts temperatures of regions of the selected slice from the energy input to the slice (calculated as described above), the known material properties and a known time between overlapping exposures. From these parameters, a predicted temperature of a region as a function of time (termed "modelled thermal history" hereinafter) can be calculated. The modelled thermal history may be calculated for a slice based in an assumption that the underlying slice is thermally homogenous. However, preferably, the modelled thermal history of a selected slice is calculated taking into account predicted temperatures for a selected number of underlying slices.

In this embodiment, the user interface is arranged to allow a user to select a number of slices below the selected slice that should be taken into account when modelling the thermal history. The processor 131 is arranged to, upon user selection, to view a thermal history for the selected slice, prioritise determination of scan parameters and scan paths for the selected number of slices below the selected slice as well as the selected slice. From this scan data, a predicted temperature of points on the selected slice as the selected slice is solidified is calculated. Basing the predicted temperature on scan data for a selected number of slices below the selected slice may result in a better prediction of the temperature of points on the selected slice compared to only considering scan data for the selected slice. For example, a rate at which a point on the selected slice cools will depend on whether there is any solidified geometry below that point and the temperature of that solidified geometry, which in turn will depend on the scan paths and scan parameters determined for the lower slice. If the solidified geometry below the point is thermally connected to other points on the selected layer that have already been solidified then thermal conduction from such points can influence the temperature of the solidified geometry below the point being solidified.

An influence of previously solidified lower slices on a temperature of points on the selected slice will diminish the further the slice from the selected slice. Beyond a certain number of slices it may be possible to assume that the solidified geometry is at a homogeneous temperature. Accordingly, not taking into account the scan data for slices a certain number of slices below the selected slice may not significantly affect the accuracy of the modelled thermal history. Limiting the scan data that is taken into account in the thermal model to a selected number of slices below the selected slice may reduce the time is takes to resolve the thermal model without impacting on the accuracy of the model.

Figure 9:
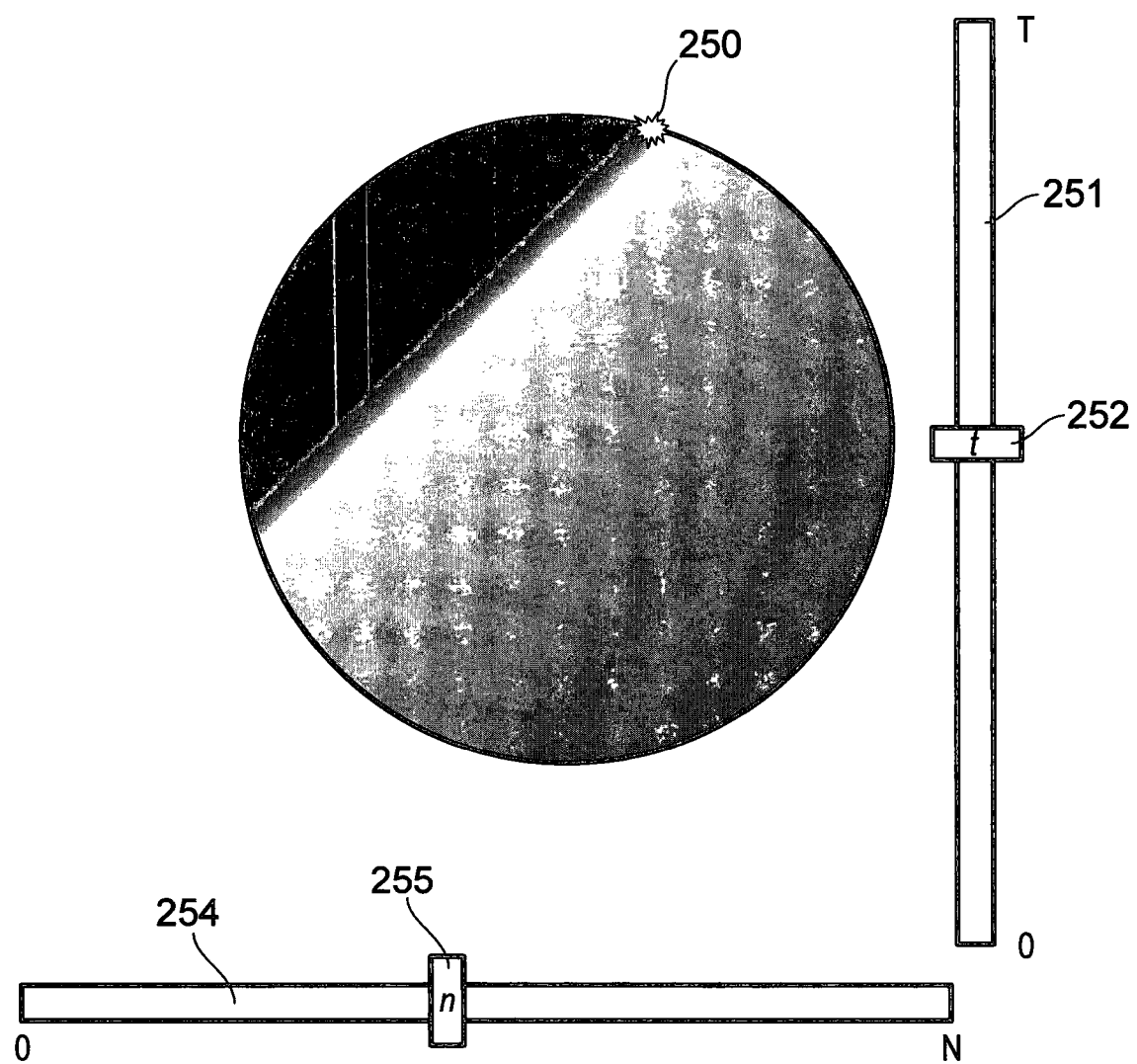
FIG. 9 shows a display showing temperature of a slice at a particular time, t.

FIG. 9 shows how the modelled thermal history is graphically represented on the display. The temperature of the points on the selected slice at a time, t, are represented by shading, such as colour shading. A location of the laser beam at the moment, t, is represented by a graphic 250. Manipulation of slider 252 along slide bar 251 causes the computer to display temperatures for the points determined for a selected time, t.

The selectable times may be limited to times in which the selected slice is solidified using the laser. However, in a further embodiment, the thermal model is resolved to determine temperatures of the points during times in which slices above the selected slice are being built. The calculation of temperatures for such times may be based on scan data determined for slices above the selected slice.

After calculating a predicted thermal history for the selected slice, the processor 131 may be arranged to calculate a predicted thermal history for slices adjacent to the selected slice and then the next nearest slices and so on until a predicted thermal history has been determined for all slices or the user selects a further slice for review. A further slide bar 254 and slider 255 may be displayed, which allows a user to move away from the selected slice to view the predicted thermal history of nearby slices. The display may provide an indication of the slices for which a predicted thermal history has been calculated, for example by expanding the slide bar 254 and/or through appropriate colouring of the slide bar 254.

The processor 131 may be arranged to resolve a stress module based on the calculated temperatures. For example, stresses may be calculated based on the geometry of the slices and a rate of contraction of the solidified material determined from a rate the material is predicted to cool (i.e. a rate of change in predicted temperature with time, determinable from the temperatures predicted using the thermal model). Such stresses may be presented in a similar manner to the temperatures, with the user being able to view changes in stresses with time for different slices. As with the scan data discussed above, an order in which stresses are determined for slices is based on selection of the slice of interest by the user, as described above.

If, after reviewing the scan data for a selected slice/slices, the user identifies scans that may be problematic, such as overly large gaps between scan paths (such as between core scan paths and border scan paths), overheating of areas of the slice or stresses above a certain magnitude, the user may choose to modify the instructions on which the scan paths and scan parameters are based. For example, the user may choose to increase or decrease a number of border scans, the hatch spacing, the laser power, point exposure time and/or point distance and/or provide additional supports. The scan data for the slices may be recalculated based on the modified instructions. Recalculation of the scan data may be confined to slices that are effected by the change in instructions, which may be fewer than all of the slices.

During the build, the infra-red (IR) camera 113 captures images of the build and these are stored in computer 130. During or after the build, the user can review the IR images together with the predicted thermal history or predicted stresses, which may provide an indication of whether the build conformed to expectations. In the case of a build failure, a comparison of the predicted temperatures and/or stresses against the IR images may provide insights into when the build started to diverge from the expected temperatures and/or stresses.

In a further embodiment, the computer is arranged to receive slice data obtained by carrying out micro-CT scans on the part built using the additive manufacturing apparatus. The CT images may be then be compared to the scan data.

In yet another embodiment, the apparatus comprise a camera, such as greyscale camera, that captures images of the build. The computer 130 may be arranged to display the images captured by the camera together with the scan data determined in the manner described above for user analysis. For example, if a part fails, the images may illustrate when, during the build, the parts begins to fail, such as curl up, and the user may compare the images of slices distorting to the stresses predicted using the stress model.

In a further embodiment, the computer 130 is arranged to determine scan data for the slices synchronously with the part being built in the laser solidification apparatus. The processor 130 may determine scan data for the slices in an order that that slices are built. Scan data for the current slice being built by the laser solidification apparatus is displayed on display 130.

It will be understood that modifications and alterations can be made to the above described embodiment without departing from the scope of the invention as defined in the claims.

The invention claimed is:

1. A device for generating scan data for use in an additive manufacturing process, in which an energy beam is scanned across layers of flowable material to consolidate the material in a layer-by-layer manner to build a part, the device comprising:
   a display;
   a user input; and
   a processor arranged to:
      determine scan data for slices of the part to be built in the additive manufacturing process;
      cause the display to display scan data that has been determined for at least one of the slices whilst determining scan data for other ones of the slices;
      receive a selection of at least one slice from the user input; and
      in response to receiving the selection of the at least one slice, (i) determine the scan data for the slices in an order such that scan data for the at least one selected slice is displayed on the display whilst scan data for other ones of the slices is being determined and (ii) modify a predetermined sequence of slices for which scan data is determined based upon the selection of the at least one slice.

2. The device according to claim 1, wherein modification of the predetermined sequence based upon the selection of the at least one slice is to interrupt the sequence in favour of determining the scan data for the at least one selected slice.

3. The device according to claim 1, wherein once scan data for the at least one slice has been determined, a further sequence is begun based upon the at least one selected slice.

4. The device according to claim 3, wherein the further sequence is to determine scan data for the slices in an order from the at least one selected slice.

5. The device according to claim 1, wherein selection of the at least one slice comprises a selection of a plurality of consecutive slices.

6. The device according to claim 1, wherein the processor is arranged to determine scan data for the slices in an order that the slices are built in the additive manufacturing process and cause the display to display scan data that has been determined for at least one of the slices whilst the scan data for the other slices, above the at least one slice, is being determined.

7. The device according to claim 6, wherein the processor is arranged to display scan data corresponding to a scan currently being carried out by the energy beam of the additive manufacturing apparatus, whilst determining scan data for other slices above the slice being formed by the scan.

8. The device according to claim 1, wherein the scan data comprises data that defines a scan/scans of the energy beam across the slice.

9. The device according to claim 8, wherein the scan data comprises scan paths and scan parameters.

10. The device according to claim 9, wherein the scan data comprises predicted values for an effect of a scan of the energy beam in accordance with the determined scan paths and scan parameters.

11. The device according to claim 10, wherein the predicted values comprise predicted energy inputs into different regions of the slice and/or predicted porosity of material solidified by the scan to form the slice.

12. The device according to claim 10, wherein the predicted values comprise a temperature profile of the slice during solidification of material with the energy beam to form the slice.

13. The device according to claim 12, wherein the processor is arranged to resolve a thermal model, based upon the scan paths and scan parameters for the slice and known material properties, to obtain the temperatures profile.

14. The device according to claim 13, wherein the thermal model for the selected slice is resolved based upon scan paths and scan parameters for the selected slice and scan paths and scan parameters for a predetermined number, but not all, of the slices below the selected slice.

15. The device according to claim 1, wherein the processor is arranged to receive modified scan instructions from the user whilst determining scan data for slices and re-determine scan data for at least one of the slices based upon the modified scan instructions.

16. A method for generating scanning data for use in an additive manufacturing process, in which an energy beam is scanned across layers of flowable material to consolidate the material in a layer-by-layer manner to build a part, the method comprising:
   determining scan data for slices of the part to be built in the additive manufacturing process;
   causing a display to display the scan data for at least one of the slices whilst determining scan data for other ones of the slices;
   receiving a selection of at least one slice; and
   in response to receiving the selection of the at least one slice, (i) determining the scan data for the slices in an order based upon the selection such that scan data for the at least one selected slice is displayed whilst the scan data for other ones of the slices is being determined and (ii) modifying a predetermined sequence of slices for which scan data is determined based upon the selection of the at least one slice.

17. The method according to claim 16, comprising determining scan data for the slices in an order in which the slices are built in the additive manufacturing process and causing the display to display scan data that has been determined for at least one of the slices whilst the scan data for the other slices, to be built later in the build, is being determined.

18. The method according to claim 17, comprising building a part using the additive manufacturing process based on the determined scan data and displaying scan data, corresponding to a scan currently being carried out by the energy beam in the additive manufacturing process, whilst determining scan data for other slices to be built later in the additive manufacturing process.

19. A device for generating slice data defining slices of a part to be built in an additive manufacturing process in which an energy beam is scanned across layers of flowable material to consolidate the material to form the part in a layer-by-layer manner, the device comprising:
   a display;
   a user input; and
   a processor arranged to:
      determine the slices from geometric data defining a part;
      cause the display to display at least one of the slices whilst other ones of the slices are being determined from the geometric data;
      receive a selection of a location on the part from the user input; and
      in response to receiving the selection of the location, (i) determine the slices in an order such that at least one slice coinciding with the selected location is displayed on the display whilst other ones of the slices are being determined and (ii) modify a predetermined sequence in which slices are determined based upon the selected location.

20. The device according to claim 19, wherein modification of the predetermined sequence based upon the selected location comprises interrupting the sequence in favour of determining a slice coinciding with the selected location.

21. The device according to claim 19, wherein the processor is arranged to provide means for healing a contour of a determined slice whilst determining other ones of the slices.

22. The device according to claim 21, wherein the processor is arranged to automatically identify a slice that requires healing and cause the display to display the slice that requires healing whilst determining other ones of the slices.

23. The device according to claim 22, wherein the processor is arranged to receive a repair input from the user indicating how to heal the slice and to heal the slice based on the repair input.

24. The device according to claim 23, wherein the processor is arranged for receiving the repair input whilst determining other ones of the slices.

25. The device according to claim 24, wherein the processor is arranged for healing the slice whilst determining other ones of the slices.

26. The device according to claim 19, wherein the processor is arranged to determine slices in an order that the slices are built in the additive manufacturing process and cause the display to display at least one of the slices whilst the scan data for the other slices, above the at least one slice, is being determined.

27. The device according to claim 26, wherein the processor is arranged to display slices corresponding to a scan currently being carried out by the energy beam of the additive manufacturing apparatus, whilst determining slices above the slice being formed by the scan.

28. A method for generating slice data defining slices of a part to be built in an additive manufacturing process in which an energy beam is scanned across layers of flowable material to consolidate the material to form the part in a layer-by-layer manner, the method comprising:
   determining the slices from geometric data defining a part;
   causing a display to display at least one of the slices whilst determining other ones of the slices from the geometric data;
   receiving a selection of a location on the part; and
   in response to receiving the selection of the location, (i) determining the slices in an order based upon the selected location such that a slice coinciding with the selected location is displayed whilst other ones of the slices are determined and (ii) modifying a predetermined sequence in which slices are determined based upon the selection of the location.

29. The method according to claim 28, comprising determining slices in an order in which the slices are built in the additive manufacturing process and causing the display to display a slice that has been determined whilst the other slices, to be built later in the build, are being determined.

30. The method according to claim 29, comprising building a part using the additive manufacturing process based on the determined slices and displaying a slice, corresponding to a scan currently being carried out by the energy beam in the additive manufacturing process, whilst determining other slices to be built later in the additive manufacturing process.

31. A data carrier having stored thereon instructions, which, when executed by a processor, cause the processor to carry out the method of claim 16.

* * * * *